United States Patent [19]

Gerfast

[11] 4,365,257

[45] Dec. 21, 1982

[54] STRETCHED-FILM OPTICAL RECORDING DISC

[75] Inventor: Sten R. Gerfast, Mendota Heights, Minn.

[73] Assignee: Minnesota Mining and Manufacturing Company, St. Paul, Minn.

[21] Appl. No.: 241,000

[22] Filed: Mar. 5, 1981

[51] Int. Cl.[3] .......... G01D 15/34

[52] U.S. Cl. .......... 346/135.1; 346/137

[58] Field of Search .......... 346/135.1, 137

[56] References Cited

U.S. PATENT DOCUMENTS

| | | | |
|---|---|---|---|
| 2,662,804 | 12/1953 | Hutton | 346/137 |
| 3,488,646 | 1/1970 | Sugaya et al. | 340/174.1 |
| 3,509,274 | 4/1970 | Kihara | 178/6.6 |
| 3,954,469 | 5/1976 | Avanzado et al. | 96/35.1 |
| 4,308,545 | 12/1981 | Lehureau et al. | 346/135.1 |

FOREIGN PATENT DOCUMENTS 2342890 3/1974 Fed. Rep. of Germany .

*Primary Examiner*—G. Z. Rubinson
*Assistant Examiner*—S. D. Schreyer
*Attorney, Agent, or Firm*—Cruzan Alexander; Donald M. Sell; Robert E. Granrud

[57] ABSTRACT

Optical recording disc having a rigid, dimensionally-stable support which keeps a plastic film taut and flat so that an optically-recordable coating on the plastic film resists the dimensional changes and warping which it otherwise might experience if unsupported. The optically-recordable coating may include an energy-absorbing layer which develops discontinuities immediately upon impingement by a focused laser beam and thus provides DRAW capability.

9 Claims, 4 Drawing Figures

STRETCHED-FILM OPTICAL RECORDING DISC

BACKGROUND TO THE INVENTION

In a typical optical video recorder, a laser beam is focused onto the surface of an optically-recordable coating of a recording disc and pulsed corresponding to a pattern of information. The laser transfers enough energy to the optically-recordable coating to burn, evaporate, melt or otherwise create a pattern of discrete optically-recordable sites which are sometimes called "pits". The information is generally represented by the sizes of and spacings between the pits.

The optically-recordable coating may be a metal coating on the order of 30 to 50 nm in thickness on a highly polished glass substrate, in which case it is necessary to create a greater relief before the recording can be physically replicated. To do this, a photo-resist coating may be applied, irradiated through the pits and developed. A metal vapor coating is applied to make the developed surface conductive, and this is plated to produce a metal, usually nickel, stamper from which a large number of replicates can be made. See U.S. Pat. No. 3,954,469.

Another master optical recording disc is shown in European patent application No. 78300865.9 filed Dec. 19, 1978 which is based on U.S. patent application Ser. No. 862,069 filed Dec. 19, 1977. A support such as glass carries a thin layer of amorphous material comprising a thermoplastic resin binder and a substance capable of absorbing energy from a pulse-encoded laser beam, thereby recording information in the form of depressions or holes surrounded by sharply defined ridges. The absorbing substance may be a dye chosen for its high absorptivity at the wavelength of the recording beam. Although each of the examples uses a glass plate as the support, it is said that the support may be a resin film such as polyethylene terephthalate which has sufficiently high melting point to avoid deformation during recording. The energy-absorbing layer is solvent-coated such as by bar-coating, spray-coating or whirl-coating. The thickness of the layer should be less than 0.45 micrometer, because thicker layers have heat-dissipation and flow properties that render them incapable of forming the desired depressions or holes. The energy-absorbing layer should have a glass transition temperature significantly higher than room temperature to be able to retain the thermal deformation pattern after recording. It is said that the boundaries of the depressions or holes are sufficiently sharp to provide a signal-to-noise ratio on playback of 40 decibels or greater.

The above-described optical recording disks have direct-read-after-write (DRAW) capability which permits adjustments to be made while the master optical disc is being recorded. DRAW capability also eliminates the time and expense of subsequent processes to make the recording readable.

In spite of the advantages of DRAW capability, it is believed that all or nearly all master optical recording discs in current production do not have this capability. Instead a photo-resist coating is applied to a glass substrate, usually after first applying an adhesion-promoting layer. After exposure a metal stamper is made from the developed coating. A plastic replicate made from the stamper must be tested before it is known whether the stamper is of adequate quality. Because it is difficult to fix the recording conditions in the absence of DRAW capability, the rejection rate of these stampers is currently rather high. Even if there were no rejections, the process would be quite expensive because of the cost of polishing the glass substrate to the desired smoothness and flatness.

Plastic replicates made from the stamper tend to expand and contract with changes in temperature, thus making it difficult to locate with precision specific recorded information. Plastic replicates also may warp to such an extent that it may be impossible to maintain focus during readback at the high speeds at which video discs are commonly rotated.

THE PRESENT INVENTION

The present invention concerns an optical recording disc which can provide recordings comparable in quality to those having polished glass supports, but at far less expense. The preferred optical recording discs of the present invention have DRAW capability. Briefly, an optical recording disc of the invention comprises a rigid, diamensionally-stable support, a thin, strong, tough plastic film which is tautly secured to said support to provide a broad, generally circular, flat area which is normally not in contact with the support, and a thin, uniform, optically-recordable coating substantially covering said broad, out-of-contact area of the plastic film, which coating is substantially free from particles greater than 0.05 micrometer and has a reflectivity such that when a beam of light 10 mm in diameter impinges on the coating at an angle of incidence of 6°, less than 5% of the reflected light is scattered at angles beyond approximately 6.5° from the angle of reflection (measured using a Hardy Spectrophotometer, e.g., General Electric Model No. 7015E30G, herein called the Light-Scattering Value which is determined by averaging 16 equally spaced readings of the scattered light and dividing by the average of 16 equally spaced readings of the total reflected light at wavelengths from 400 to 700 nm).

Because a focused laser beam used to record information on the optically-recordable coating typically has a diameter of about one micrometer, the presence of particles which are greater than 0.05 micrometer might cause undue variations in recordings and hence errors in playback. If the Light-Scattering Value were substantially more than 5%, there might be undue noise upon playback of recorded information. Light-Scattering Values of less than 2% should be readily attainable in large-scale production.

The dimensional stability and flatness of the optically-recordable coating depend almost exclusively upon the disc support which may be made of an alloy selected to experience very little expansion or contraction over the temperature range that should be encountered in use. The plastic film is so constrained by the disc support that any tendency it may have to shrink or expand is virtually eliminated.

If the plastic film is secured to the support only at the outer periphery of the out-of-contact area, that periphery is preferably a circle and should lie in a plane so that the plastic film is perfectly flat. If the disc support provides an annular out-of-contact area, preferably both lines of contact lie in the same plane. Alternatively, the inner and outer lines of contact may lie in two parallel planes, in which event the plastic film is conical and is flat in the sense that it is free from undulations and distortions.

A number of commercially available plastic films have adequate strength and toughness to be useful, but ordinary commercially available plastic films do not have a smoothness approaching that of the glass substrates used in master video discs. If a laser beam used to record information is to impinge directly onto the optically-recordable coating, and the surface of the plastic film has a degree of roughness such that the Light-Scattering Value of the optically-recordable coating would substantially exceed 5%, a subbing layer preferably is applied to improve the smoothness. A subbing layer also can mask minute imperfections in the surface of the plastic film.

If the optical recording disc is of the reflective type, it is preferable that the optically-recordable coating include a thin metal film in order to provide a specular surface which reflects the recording beam. This conserves energy and also aids focusing. If a laser beam used to record information is to pass through the plastic film before reaching the optically-recordable coating, the reflective metal film should be more remote from the laser source than any other layer of the optically-recordable coating. If the optical recording disc is of the transmission type, the optically-recordable coating should be transparent or semi-transparent or become open or transparent in recorded areas. Also, that portion of the disc support adjacent the area to be recorded should either be open or transparent. Smoothness of the exposed surface of the plastic film is less critical since it is out of focus when the laser beam is focused on the optically-recordable coating.

The plastic film preferably has a tensile strength of at least 1000 kgf/cm$^2$ and an initial tear strength of at least 300 gf/mil [12 kgf/mm], ASTM Test Method D-1004. The thickness of the plastic film is preferably within the range of 15 to 200 micrometers. It is currently difficult to attain good surface smoothness at lesser thicknesses whereas films of greater thickness are more difficult to use and might break loose from the disc support if heated to make them taut.

The plastic film may either be adhesively bonded or mechanically fastened to the support, and preferably it is heat-shrinkable so that after being thus secured, moderate heating will make it taut and wrinkle-free over the area in which it is not in contact with the disc support. This should provide sufficient tautness that if removed from the disc support at 18° C., it will retract at least 0.05 percent, preferably at least 0.1 percent. If the outer diameter of the out-of-contact area is greater than 15 cm, the plastic film is preferably secured to the disc support both at the periphery and at the center to improve the dynamic stability of the out-of-contact area.

To facilitate tensioning of the plastic film, the disc support may have a tapered surface or ramp radially beyond the out-of-contact area of the plastic film. While holding the film in taut condition, the film may be stretched across the ramp and then secured to the ramp to keep the film under tension. If any wrinkles remain, they can be eliminated by heating to a temperature at which the plastic film begins to shrink.

A preferred plastic film is biaxially-oriented polyethylene terephthalate which has a tensile strength on the order of 1800 kg/cm$^2$ and an initial tear strength on the order of 700 gf/mil [28 kgf/mm]. It has excellent long-term stability at temperatures to which the novel recording medium may be exposed in use, but it readily shrinks after being heated to moderately elevated temperatures while secured to a disc support to develop good tautness. Other useful plastic films include polycarbonates, polyolefins and vinyls such as polyvinyl chloride.

To the extent feasible, the line or lines of contact between the support and the plastic film should be circular. A degree of nonplanarity can be tolerated in each circle of contact if the resultant vertical runout in the out-of-contact area of the plastic film does not substantially exceed 500 micrometers peak-to-peak, a variation which can be readily compensated for by servo-controlled focusing. Where the disc support provides central support for the plastic film substrate, it is much preferred that both circles of contact lie in the same plane to simplify focusing.

An optical recording disc of the present invention may have DRAW capability if, like that of the aforementioned European patent application, its optically-recordable coating includes an energy-absorbing layer which comprises a thermoplastic resin and a substance such as a dye which is highly absorptive at the wavelength of the recording beam. A focused, modulated laser beam can instantaneously produce discontinuities in the energy-absorbing layer, which discontinuities should be physically replicable. The glass transition temperature of the thermoplastic resin ought to exceed the highest temperature to which the novel media will be exposed after being recorded, but preferably is close to that temperature to conserve the energy requirements of the recording beam. The European patent application teaches that the thickness of the energy-absorbing layer should be less than 0.45 micrometer. Below about 0.05 micrometer the recorded discontinuities may lack sufficient relief to provide good physical replicability.

If it is desired to make physical replicates of the recorded medium of the invention, the support may be so shaped that there is a small, uniform spacing between a surface of the support and that portion of the plastic film which is not in contact with the support. A uniform spacing within the range of 100 to 200 micrometers is preferred. This permits a coating of replicating material to be applied over the recorded surface of the medium and metered to smoothness against the underlying surface of the support. For such use, it is preferred that the out-of-contact area of the plastic film extend somewhat radially beyond that portion of the optically-recordable layer which is to be recorded.

Virtually any of the optically-recordable coatings which can be applied to glass substrates may be employed in the present invention unless higher temperature is required to create such a coating than can be tolerated by the plastic film. These include photoresist, chalcogenide, vapor-deposited dye, bismuth and other types discussed in Bartolini et al., "Optical Disk Systems Emerge", IEEE Sprectrum, August 1978, pages 20–28. Many of these provide DRAW capability.

THE DRAWING

Figure 1:
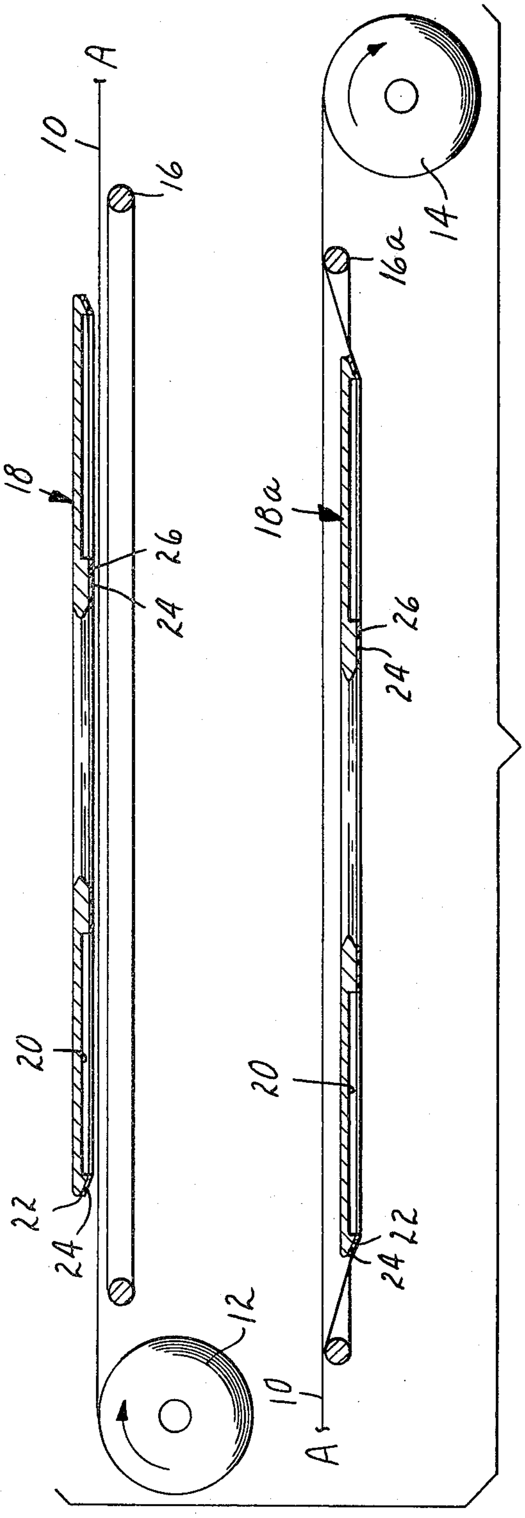
FIG. 1 is a sketch which indicates schematically portions of an automated assembly line for adhesively securing plastic film to disc supports to provide precursors of preferred optical recording discs of the invention.

In FIG. 1, a plastic film 10 is unwound from a supply roll 12 and clamped by tenter hooks (not shown) which continuously carry the film to a windup roll 14. The tenter hooks are adjusted to stretch the travelling film 10 slightly in both the longitudinal and transverse directions. Travelling with the film are mechanisms (not shown) for supporting identical hoop fixtures 16 and 16*a* and identical disc supports 18 and 18*a*, all of which are shown in central section. Each of supports 18 and 18*a* has an annular recess 20, and its face beyond the recess is tapered to provide a ramp 22. A fast-curing adhesive 24 has been applied both to the ramp and to the unrecessed central face 26 of the disc support.

The support 18*a*, while travelling with the film 10, has been moved toward the film so that the portion of the film within the hoop fixture 16*a* has been further stretched to a modest extent against the ramp of the support 18*a*. Heat is applied (as by infrared lamps, not shown) to cure the adhesive 24, whereupon the film is cut at the radially-outer edge of the ramp, the support 18*a* and hoop fixture 16*a* are retracted, and the residue of the film is wound up in a roll 14 as scrap. Upon being retracted, the disc support 18*a* is released and its associated travelling mechanism is returned to carry another disc support along the film 10 for assembly.

Instead of traveling with the film, one or more hoop fixtures 16 and 16*a* may have fixed positions, with the film being periodically advanced.

Figure 2:
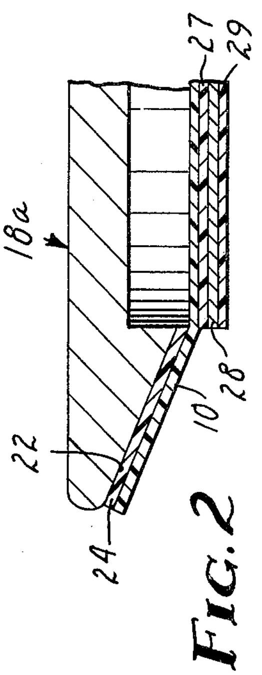
FIG. 2 is a partial schematic central cross-section of a completed optical recording disc made using the apparatus of FIG. 1, enlarged to show details.

After the support 18*a* with the adhered plastic film has been removed from the assembly line of FIG. 1, any wrinkles in the film can be removed by blowing heated air across the exposed face of the film to cause it to shrink slightly. Then a subbing layer 27 may be applied to the exposed surface of the plastic film 10 to provide a smoother surface. A reflective metal film 28 may be deposited onto the subbing layer and an energy-absorbing layer 29 may be applied over the metal film, thus providing an optical recording disc of the invention as shown in fragmentary cross-section in FIG. 2.

Figure 3:
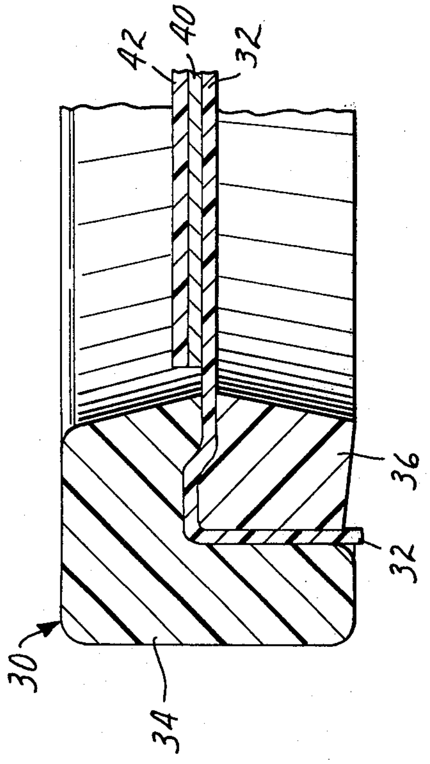
FIG. 3 is a partial schematic central cross-section of another optical recording disc of the invention wherein a plastic film is mechanically secured to a support.

FIG. 3 shows an optical recording disc having a disc support 30 to which a plastic film 32 has been secured. The disc support 30 has two hoop-shaped elements, namely an outer ring 34 and an inner locking member 36 which, upon being moved into position, stretches the film 32 and then frictionally secures it in a taut condition. Subsequently, a reflective metal layer 40 and an energy-absorbing layer 42 may be applied to the film 32 where it is not in contact with the support 30. Rings 34 and 36 have been made by injection molding 30% glass-fiber-filled polycarbonate to provide a strong disc support having a diameter of 13.5 cm which had reasonably good dimensional stability over a moderate range of ordinary room temperatures. Injection molding of 30% glass-fiber-filled polyester resin provided an equally useful disc support.

Figure 4:
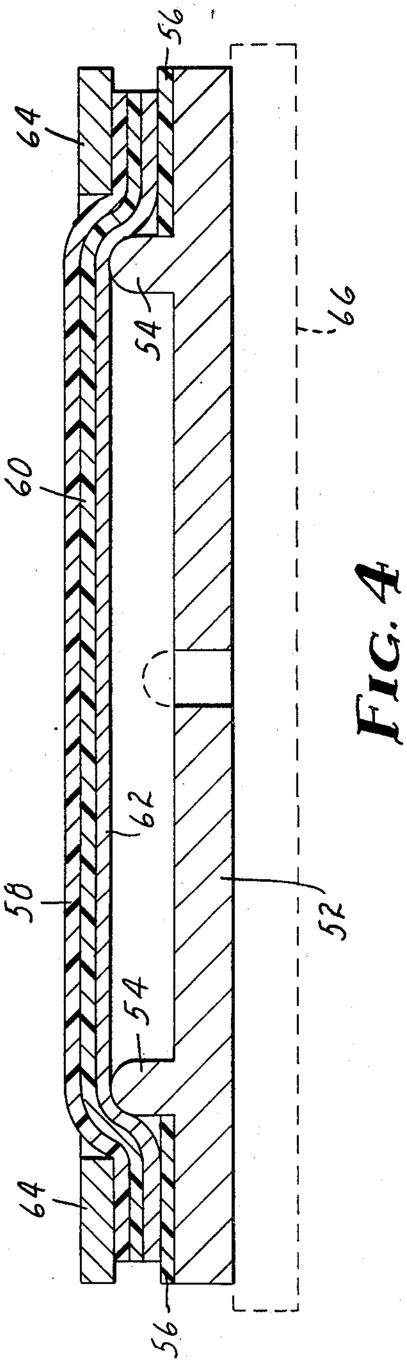
FIG. 4 is a partial schematic central cross-section of a third optical recording disc of the invention.

FIG. 4 shows an optical recording disc having a metal support 52, the upper face of which has been machined to leave a circular ridge 54. After coating adhesive 56 onto the face beyond the ridge, a transparent plastic film 58 has been laid over the support 52. Previously an energy-absorbing layer 60 had been applied to the plastic film 58 and a vapor-deposited reflective metal layer 62 had been applied over the layer 60. A metal ring 64 having an inner diameter greater than the outer diameter of the ridge 54 is shown pressing the metal layer 62 of the plastic film 58 against the adhesive 56, thus slightly stretching the out-of-contact portion of the plastic film 58 until the adhesive cures to hold the film in a permanently taut condition. The ring 64 is then removed. The optically-recordable layer 60 of the resultant optical recording disc is protected, and any dust or dirt which might accumulate on the exposed surface of the plastic film 58 may be wiped off without damaging the recording layer. The optical recording disc may be driven on a turntable 66 which is shown in phantom lines.

EXAMPLE 1

A support as shown in FIG. 1 of the drawing was machined from aluminum 8075 alloy. Its outer diameter was 200 mm and its thickness was 1.8 mm. Its annular recess was 0.13 mm in depth, 192 mm in outer diameter and 85 mm in inner diameter. After machining, a stack of about ten of the disc supports was placed in an oven on a flat aluminum plate and covered by a flat cast-iron plate about 14 kg in weight. The oven was then heated from room temperature to about 315° C., held at that temperature for a few hours and allowed to cool overnight to room temperature in order to anneal the disc supports.

Used as the plastic film was biaxially-oriented polyethylene terephthalate film 0.05 mm in thickness having a vapor-deposited aluminum layer. While this film was held flat, but not under tension, by a hoop-shaped fixture of about 38-cm diameter, a room-temperature-curing epoxy adhesive was applied to the ramp and unrecessed central face of one of the annealed disc supports. The disk support was laid on the film with its adhesive surfaces against the uncoated face of the film. A flat 3-kg aluminum plate was laid over the disc support, thus slightly stretching the film until the adhesive was cured. After applying moderate heat to make the film taut, a solution of 0.5 g red dye (Oil Red O, Aldrich)
2 g polyvinylidene chloride
98 g cyclohexanone was spin-coated at 350 rpm over the aluminum layer and then dried at 50° C. for two hours to a dried thickness of about 0.25 micrometer to provide an energy-absorbing layer. Video signals were recorded as depressions or holes in the energy-absorbing layer with a modulated beam at 488 nm from an argon ion laser and later played by using a Universal Pioneer player which has a helium-neon laser. A good video picture was obtained on playback except for defects similar in appearance to dropouts experienced in magnetic video-tape recording. These defects were attributed to imperfections in the surface of the polyester film, thus indicating the desirability either of using a smoother film or applying a subbing layer to the film before applying the optically-recordable coating.

In order to measure the Light-Scattering Value of the optically-recordable coating, it would be necessary to cut out a piece of the film. To avoid doing so, the Light-Scattering Value of the optically-recordable coating of Example 1 was estimated to be about one percent based on results with the similarly coated film of Example 2.

EXAMPLE 2

To biaxially-oriented polyethylene terephthalate film of 0.1 mm thickness was applied by magnetically assisted sputtering an adhesion-promoting layer of titanium suboxide, one nanometer in thickness. Over this layer, a 30-nm aluminum layer was deposited by thermal evaporation. Over the aluminum layer was applied by spin-coating at 450 rpm a solution of 1 g polyvinyl butyral
1 g red diazo dye
99 g cyclohexanone.

This was dried at 80° C. for 30 minutes to a dried thickness on the order of 70 nm to provide an energy absorbing layer which in combination with the aluminum layer provided an optically-recordable coating. The Light-Scattering Value of the coating as measured from its faceside was 1.2%.

EXAMPLE 3

An aluminum support was machined and annealed as in Example 1 except that its outer diameter was 350 mm, its thickness was 6 mm, and its annular recess had an outer diameter of 330 mm, an inner diameter of 100 mm, and a depth of 0.13 mm. An uncoated biaxially-oriented 0.05 mm polyethylene terephthalate film was adhered to the disc support and heated to tautness as in Example 1, and then layers were applied to the film in the following order to provide a 4-layer optically-recordable coating:

1.2 nm of chrome suboxide applied by magnetically assisted sputtering.
35 nm of aluminum applied by magnetically assisted sputtering.
35.5 nm of polymethyl methacrylate applied by plasma polymerization.
15 nm of carbon applied by electron-beam vacuum evaporation.

An 8-megacycle squarewave was recorded on the resulting optical recording disc using an argon ion laser operating at 514 nm and focused onto the optically-recordable coating at a diameter of approximately one micrometer. Laser power incident on the disc was approximately 10–15 mW and produced protuberances in the energy-absorbing carbon layer. This recording was read back using a helium-neon laser to provide a good reproduction of the squarewave.

The Light-Scattering Value of the optically-recordable coating was estimated from tests on similar optically-recordable coatings to be about one percent. One such similar optically-recordable coating was that of Example 4.

EXAMPLE 4

An optical recording disk was made using a disk support as in Example 1 and by the procedure of Example 3, except that the aluminum layer was 49 nm in thickness and was applied by thermal evaporation, the polymethyl methacrylate layer was 480 nm in thickness, and the carbon layer was 20 nm in thickness. A squarewave signal was recorded using 10–15 mW of optical power from an argon ion laser.

The Light-Scattering Value of the optically-recordable coating (measured after cutting out an unrecorded area of the taut film) was 1.2%.

EXAMPLE 5

An aluminum disc support as shown in FIG. 4 had an outer diameter of 355 mm and was machined to provide a circular ridge which was 312 mm in diameter and 3.2 mm in height. Its spindle opening was 7.3 mm in diameter. After an epoxy cement had been coated onto the face of the disc support beyond the circular ridge, a 0.18 mm biaxially-oriented polyethylene terephthalate film was stretched over the circular ridge using a fixture which was temporarily screwed to the disk at points beyond the ridge. A metal ring held the film against the cement until it was cured. The exposed face of the film was then vacuum vapor-coated with bismuth to a thickness of about 20 nm to provide an optically-recordable coating.

A video-color-bar signal was recorded onto and played back from the energy-absorbing bismuth layer using a laser. The area of the film near the circular ridge was not flat so that a good focus could not be maintained there. However, a good focus could be maintained in the central area, and reproduction of the color-bar signal from this area was of reasonably good quality.

EXAMPLE 6

The optically-recordable coating of an optical recording disc similar to that of Example 5 was subjected to tests for Light-Scattering Values both from the face-side and from the backside with the following results:

From faceside: 1.4%
From backside: 3.7%

It is believed that the higher value from the backside was due to the effect on the bismuth of contaminants on the surface of the polyethylene terephthalate film. It should be possible to obtain a lower Light-Scattering Value by cleaning the face of the plastic film before applying the optically-recordable coating.

I claim:

1. An optical recording disc comprising
a rigid, dimensionally-stable support,
a thin, strong, tough plastic film which is tautly secured to said support to provide a broad, generally circular, flat area which is normally not in contact with the support, and
a thin, uniform, optically-recordable coating substantially covering said broad out-of-contact area of the plastic film, which coating is substantially free from particles greater than 0.05 micrometer and has a Light-Scattering Value as herein defined of less than 5%.

2. An optical recording disc as defined in claim 1 wherein said optically-recordable coating includes an energy-absorbing layer which develops discontinuities immediately upon impingement by a focused laser beam and accordingly has DRAW capability.

3. An optical recording disc as defined in claim 1, wherein said plastic film is adhesively bonded to said support.

4. An optical recording disc as defined in claim 1, wherein said plastic film is mechanically fastened to said support.

5. An optical recording disc as defined in claim 1, wherein the disc support is so shaped that there is a very small, uniform spacing between a flat surface of the support and said out-of-contact area of the plastic film.

6. An optical recording disc as defined in claim 5, wherein said uniform spacing is within the range of 0.1 to 0.2 mm.

7. An optical recording disc as defined in claim 6, wherein said plastic film is secured to said support only at the outer periphery of said out-of-contact area and said uniform spacing extends over substantially the entire area of the support.

8. An optical recording disc as defined in claim 5, wherein said out-of-contact area is annular and said plastic film is secured at both its outer and inner peripheries to the support.

9. An optical recording disc as defined in claim 1, including a subbing layer between said plastic film and said optically-recordable coating.

* * * * *